United States Patent
Hsu et al.

(10) Patent No.: US 11,329,702 B2
(45) Date of Patent: May 10, 2022

(54) MULTI-IN MULTI-OUT BLUETOOTH MODULE, AND WIRELESS DEVICE USING THE MULTI-IN MULTI-OUT BLUETOOTH MODULE

(71) Applicant: MEDIATEK INC., Hsin-Chu (TW)

(72) Inventors: Chien-Fang Hsu, Hsinchu (TW); Li-Chun Ko, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 335 days.

(21) Appl. No.: 16/422,478

(22) Filed: May 24, 2019

(65) Prior Publication Data
US 2019/0393932 A1    Dec. 26, 2019

Related U.S. Application Data

(60) Provisional application No. 62/689,311, filed on Jun. 25, 2018.

(51) Int. Cl.
| | | |
|---|---|---|
| *H04B 7/0413* | (2017.01) | |
| *H04W 4/80* | (2018.01) | |
| *H04B 1/713* | (2011.01) | |
| *H04W 80/02* | (2009.01) | |
| *H04W 56/00* | (2009.01) | |
| *H04W 12/10* | (2021.01) | |
| *H04W 72/12* | (2009.01) | |
| *H04W 84/18* | (2009.01) | |

(52) U.S. Cl.
CPC ......... *H04B 7/0413* (2013.01); *H04B 1/713* (2013.01); *H04W 4/80* (2018.02); *H04W 12/10* (2013.01); *H04W 56/001* (2013.01); *H04W 72/1215* (2013.01); *H04W 80/02* (2013.01); *H04W 84/18* (2013.01).

(58) Field of Classification Search
None
See application file for complete search history.

(56) References Cited

U.S. PATENT DOCUMENTS

| | | | |
|---|---|---|---|
| 6,873,825 | B2 | 3/2005 | Pattabiraman |
| 8,515,351 | B2 | 8/2013 | Grushkevich |
| 8,553,592 | B2 | 10/2013 | Yang |

(Continued)

FOREIGN PATENT DOCUMENTS

| | | |
|---|---|---|
| CN | 1640075 A | 7/2005 |
| CN | 101909107 A | 12/2010 |

(Continued)

OTHER PUBLICATIONS

Zhifeng Jiang, Victor C.M. Leung and Vincent W.S. Wong, Reducing Collisions between Bluetooth Piconets by Orthogonal Hop Set Partitioning, pp. 1-4 (Year: 2003).*

(Continued)

*Primary Examiner* — Christopher M Crutchfield
(74) *Attorney, Agent, or Firm* — McClure, Qualey & Rodack, LLP

(57) ABSTRACT

A multi-input multi-output (MIMO) Bluetooth module with effectively suppressed mutual interference is disclosed. The MIMO Bluetooth module has multiple Bluetooth transceivers which operate in a synchronized transmission mode, in which no Bluetooth transceiver is permitted to transmit data when any of the Bluetooth transceivers are receiving data.

20 Claims, 9 Drawing Sheets

(56) References Cited

U.S. PATENT DOCUMENTS

| | | | |
|---|---|---|---|
| 8,811,241 B2 | 8/2014 | Wilhelmsson et al. | |
| 9,860,754 B2 | 1/2018 | Su et al. | |
| 2002/0150147 A1* | 10/2002 | Liang | H04L 27/28 375/133 |
| 2004/0233879 A1* | 11/2004 | Ascheuer | H04W 72/0446 370/338 |
| 2008/0098212 A1* | 4/2008 | Helms | H04N 21/8193 713/155 |
| 2009/0176454 A1* | 7/2009 | Chen | H04W 16/14 455/63.1 |
| 2010/0203832 A1 | 8/2010 | Russell et al. | |
| 2011/0103309 A1* | 5/2011 | Wang | H04W 72/0406 370/328 |
| 2011/0263214 A1* | 10/2011 | Robinson | H04B 1/0458 455/88 |
| 2013/0260687 A1* | 10/2013 | Paycher | H04W 72/1215 455/41.2 |
| 2014/0161112 A1* | 6/2014 | Darwood | H04W 56/0005 370/336 |
| 2016/0380778 A1* | 12/2016 | Shen | H04L 45/04 709/209 |
| 2017/0011467 A1* | 1/2017 | Farmer | G06Q 40/08 |
| 2020/0244306 A1* | 7/2020 | Versteeg | H04B 1/7143 |

FOREIGN PATENT DOCUMENTS

| | | |
|---|---|---|
| CN | 1937439 B | 12/2011 |
| CN | 102461328 A | 5/2012 |
| CN | 102668614 A | 9/2012 |
| CN | 104218976 A | 12/2014 |
| CN | 104333397 A | 2/2015 |
| CN | 104853358 B | 5/2018 |

OTHER PUBLICATIONS

I. Ashraf, A. Gkelias, M. Dohler and A.H. Aghvami, Time-synchronised multi-piconet Bluetooth environments, pp. 1-8 (Year: 2006).*

N Amanquab and J Dunlop, Improved throughput by Interference Avoidance in co-located Bluetooth networks, pp. 1-5 (Year: 2003).*

Jingli Li and Xiangqian Liu, Evaluation of Co-channel and Adjacent Channel Interference for Multiple Bluetooth Piconets with Dual Channel Transmission, pp. 1-6 (Year: 2007).*

Weiping Suny, Jonghoe Kooy, Seongho Byeony, Woojin Parkz, Sangsoon Limz, Daehyun Banz, and Sunghyun Choiy, BlueCoDE: Bluetooth Coordination in Dense Environment for Better Coexistence, pp. 1-10 (Year: 2017).*

Chinese language office action dated Mar. 3, 2021, issued in application No. CN 201910528403.6.

* cited by examiner

MULTI-IN MULTI-OUT BLUETOOTH MODULE, AND WIRELESS DEVICE USING THE MULTI-IN MULTI-OUT BLUETOOTH MODULE

CROSS REFERENCE TO RELATED APPLICATIONS

This application claims the benefit of U.S. Provisional Application No. 62/689,311, filed on Jun. 25, 2018, the entirety of which is incorporated by reference herein.

BACKGROUND OF THE INVENTION

Field of the Invention

The invention relates to mutual interference reduction between multiple Bluetooth transceivers.

Description of the Related Art

Bluetooth, a wireless communication standard that allows devices to exchange data over short distances, uses short-wave ultra-high frequency (UHF) radio to communicate via the 2.4 to 2.485 GHz ISM (Industrial Scientific Medical) band.

In radio, the multi-input and multi-output (MIMO) structure is common, which uses multiple transmission and receiving antennas to exploit multipath propagation. MIMO has become an essential element of wireless communication standards. When using multiple Bluetooth transceivers to implement the MIMO structure, it is an important topic to effectively reduce mutual interference between the different Bluetooth transceivers.

BRIEF SUMMARY OF THE INVENTION

A MIMO (multi-input multi-output) Bluetooth module in which mutual interference is effectively suppressed is disclosed.

A MIMO Bluetooth module in accordance with an exemplary embodiment of the disclosure includes a first Bluetooth transceiver, a second Bluetooth transceiver, and a control unit. The control unit operates the first Bluetooth transceiver and the second Bluetooth transceiver to achieve a synchronized transmission mode. Accordingly, the control unit stops using the first Bluetooth transceiver to transmit data when the second Bluetooth transceiver is receiving data, and vice versa.

The control unit may further operate the first Bluetooth transceiver and the second Bluetooth transceiver to achieve a synchronized receiving mode. The control unit operates the first Bluetooth transceiver and the second Bluetooth transceiver by frequency division when the first Bluetooth transceiver and the second Bluetooth transceiver are in the synchronized receiving mode.

In an exemplary embodiment, the control unit operates the first Bluetooth transceiver and the second Bluetooth transceiver by frequency division when the first Bluetooth transceiver and the second Bluetooth transceiver are in the synchronized transmission mode.

In an exemplary embodiment, the control unit operates the first Bluetooth transceiver in a first frequency map, and operates the second Bluetooth transceiver in a second frequency map which does not overlap the first frequency map.

In an exemplary embodiment, the control unit operates the first Bluetooth transceiver in a first frequency map, and operates the second Bluetooth transceiver in a second frequency map that partially overlaps the first frequency map. The control unit controls the first Bluetooth transceiver and the second Bluetooth transceiver to operate at non-overlapping hopping frequencies.

The control unit may further operate the first Bluetooth transceiver and the second Bluetooth transceiver to achieve a synchronized receiving mode. The control unit operates the first Bluetooth transceiver and the second Bluetooth transceiver by frequency division when the first Bluetooth transceiver and the second Bluetooth transceiver are in the synchronized receiving mode.

In an exemplary embodiment, the control unit operates the first Bluetooth transceiver and the second Bluetooth transceiver for carrier aggregation (CA). The first Bluetooth transceiver and the second Bluetooth transceiver transmit one file by a doubled bandwidth due to the synchronized transmission mode. In another exemplary embodiment, the first Bluetooth transceiver and the second Bluetooth transceiver transmit a first file and a second file, respectively, at the same time.

In an exemplary embodiment, the control unit operates the first Bluetooth transceiver and the second Bluetooth transceiver in a way of dual mode dual concurrent (DMDC). When the first Bluetooth transceiver is in a Bluetooth classic mode, the second Bluetooth transceiver is in a Bluetooth low-energy mesh mode.

In an exemplary embodiment, the first Bluetooth transceiver is a master paired with a first far-end Bluetooth transceiver that is a slave, and the second Bluetooth transceiver is a master paired with a second far-end Bluetooth transceiver that is a slave. The first Bluetooth transceiver determines a first frequency map for communication with the first far-end Bluetooth transceiver and the second Bluetooth transceiver determines a second frequency map for communication with the second far-end Bluetooth transceiver. The control unit controls the first Bluetooth transceiver and the second Bluetooth transceiver to make sure that the first frequency map and the second frequency map do not overlap, or to make sure that the first frequency map and the second frequency map only partially overlap, and are used according to non-overlapping hopping frequencies during the synchronized transmission mode and the synchronized receiving mode.

In another exemplary embodiment, the first Bluetooth transceiver is a master paired with a first far-end Bluetooth transceiver that is a slave, and the second Bluetooth transceiver is a slave paired with a second far-end Bluetooth transceiver that is a master. The first Bluetooth transceiver determines a first frequency map for communication with the first far-end Bluetooth transceiver and the second far-end Bluetooth transceiver determines a second frequency map for communication with the second Bluetooth transceiver. The first Bluetooth transceiver determines the first frequency map according to the second frequency map to make sure that the first frequency map and the second frequency map do not overlap, or to make sure that the first frequency map and the second frequency map only partially overlap, and are used according to non-overlapping hopping frequencies during the synchronized transmission mode and the synchronized receiving mode.

In another exemplary embodiment, the first Bluetooth transceiver is a slave paired with a first far-end Bluetooth transceiver that is a master, and the second Bluetooth transceiver is a slave paired with a second far-end Bluetooth transceiver that is a master. The first far-end Bluetooth transceiver determines a first frequency map for communication with the first Bluetooth transceiver and the second far-end Bluetooth transceiver determines a second frequency map for communication with the second Bluetooth transceiver. The control unit controls the first Bluetooth transceiver and the second Bluetooth transceiver to provide recommendations to the first far-end Bluetooth transceiver and the second far-end Bluetooth transceiver, and thereby the first far-end Bluetooth transceiver and the second far-end Bluetooth transceiver make sure that the first frequency map and the second frequency map do not overlap, or to make sure that the first frequency map and the second frequency map only partially overlap, and are used according to non-overlapping hopping frequencies during the synchronized transmission mode and the synchronized receiving mode.

In an exemplary embodiment, the control unit includes a unified media access controller controlling both the first Bluetooth transceiver and the second Bluetooth transceiver.

In another exemplary embodiment, the control unit includes a first media access controller and a second media access controller controlling the first Bluetooth transceiver and the second Bluetooth transceiver, respectively. The first media access controller and the second media access controller coordinate with each other according to coordinating signals, for the synchronized transmission mode and the synchronized receiving mode of the first Bluetooth transceiver and the second Bluetooth transceiver.

A wireless device may include the aforementioned MIMO Bluetooth module and a WiFi transceiver. The WiFi transceiver and Bluetooth transceivers within the multi-input multi-output Bluetooth module share the transmission band by time-division multiplexing.

In an exemplary embodiment, the first Bluetooth transceiver and the second Bluetooth transceiver use a doubled bandwidth for Bluetooth data transmission to reserve more time for WiFi transmission.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows embodiments of carrying out the invention. This description is made for the purpose of illustrating the general principles of the invention and should not be taken in a limiting sense. The scope of the invention is best determined by reference to the appended claims.

Figure 1:
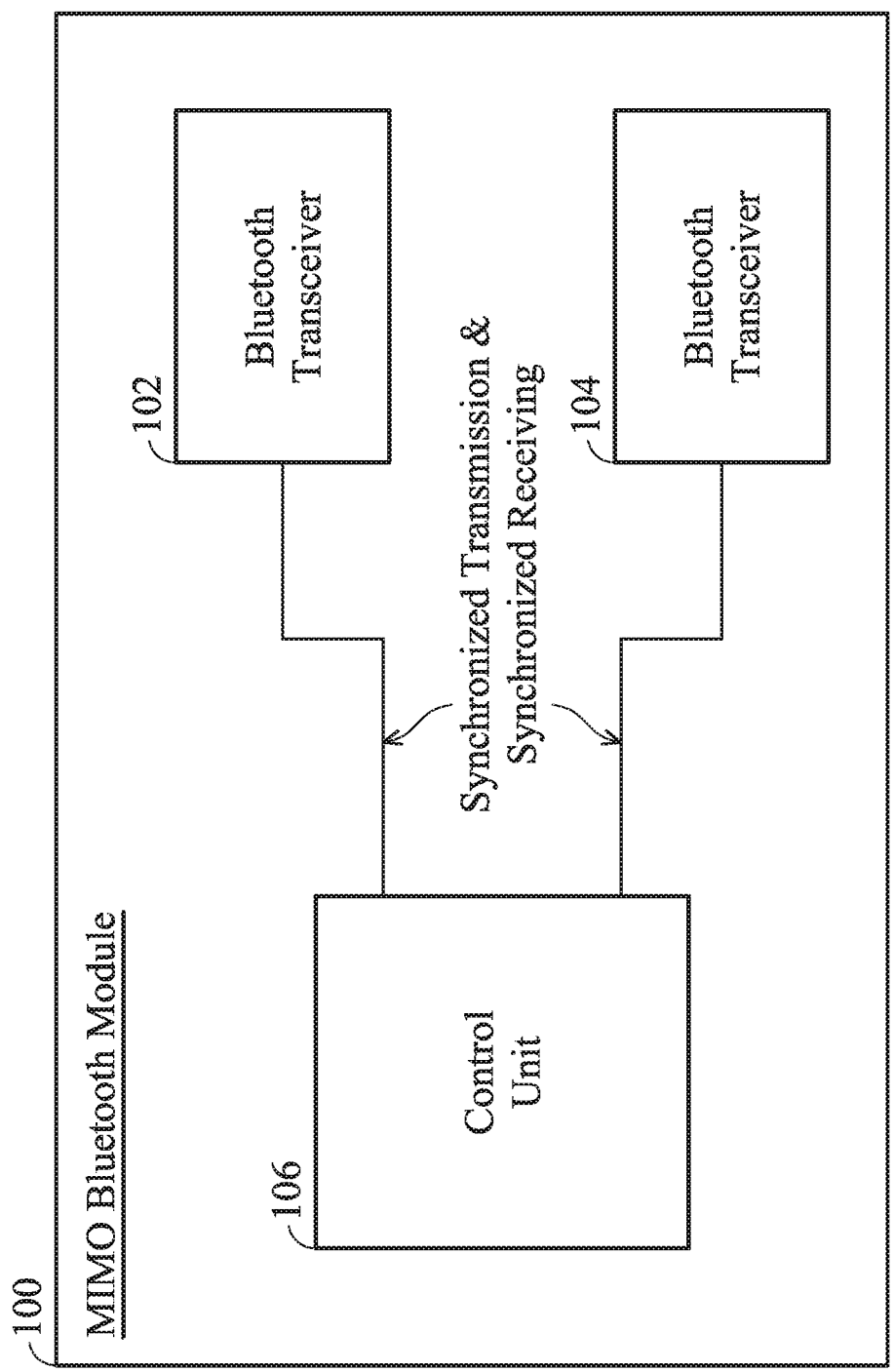
FIG. 1 is a block diagram depicting a MIMO (multi-input multi-output) Bluetooth module 100 in accordance with an exemplary embodiment of the disclosure.

FIG. 1 is a block diagram depicting a MIMO (multi-input multi-output) Bluetooth module 100 in accordance with an exemplary embodiment of the disclosure.

The MIMO Bluetooth module 100 may be implemented by a combo chip or a printed-circuit board (PCB) with multiple chips mounted thereon. The MIMO Bluetooth module 100 has two Bluetooth transceivers 102 and 104 (or more) and uses a control unit 106 to control the Bluetooth transceivers 102 and 104. To reduce mutual interference between the two Bluetooth transceivers 102 and 104, the control unit 106 avoids using the Bluetooth transceiver 102 to transmit data when using the Bluetooth transceiver 104 to receive data, and avoids using the Bluetooth transceiver 104 to transmit data when using the Bluetooth transceiver 102 to receive data. When operating the Bluetooth transceiver 102 in a transmission mode, the control unit 106 also operates the Bluetooth transceiver 104 in the transmission mode. When operating the Bluetooth transceiver 102 in a receiving mode, the control unit 106 also operates the Bluetooth transceiver 104 in the receiving mode.

Under the control of the control unit 106, synchronized transceiving (synchronized transmission mode and synchronized receiving mode are performed between the Bluetooth transceivers 102 and 104.

The control unit 106 stops using the Bluetooth transceiver 102 to transmit data while the Bluetooth transceiver 104 is receiving data. Vice versa, the control unit 106 stops using the Bluetooth transceiver 104 to transmit data while the Bluetooth transceiver 1042 is receiving data.

Figure 2A:
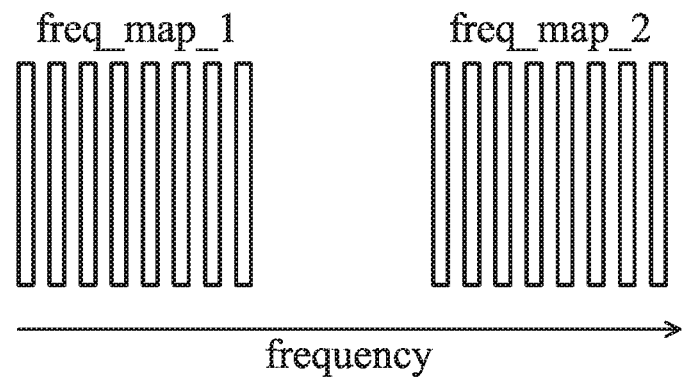
FIG. 2A shows non-overlapping frequency maps freq_map_1 and freq_map_2.

For the synchronized transmission mode or the synchronized receiving mode, the control unit 106 operates the Bluetooth transceivers 102 and 104 by frequency-division multiplexing. A frequency map freq_map_1 is assigned to the Bluetooth transceiver 102. Another frequency map freq_map_2 is assigned to the Bluetooth transceiver 104. FIG. 2A shows non-overlapping frequency maps freq_map_1 and freq_map_2. There is no inter-radio interference between the transceiving synchronized Bluetooth transceivers 102 and 104.

Figure 2B:
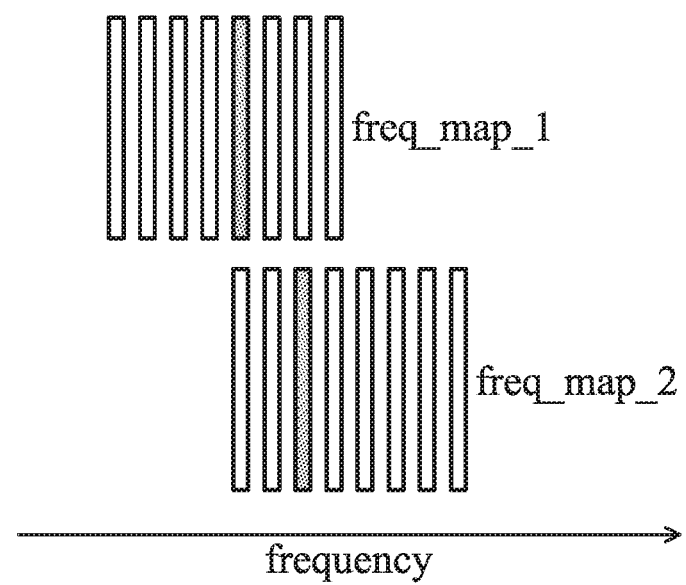
FIG. 2B shows the partially-overlapping frequency maps freq_map_1 and freq_map_2 assigned to the Bluetooth transceivers 102 and 104.

In another exemplary embodiment, partially-overlapping frequency maps are assigned to the Bluetooth transceivers 102 and 104. FIG. 2B shows the partially-overlapping frequency maps freq_map_1 and freq_map_2 assigned to the Bluetooth transceivers 102 and 104. The control unit 106 operates the Bluetooth transceivers 102 and 104 to use the partially-overlapping frequency maps freq_map_1 and freq_map_2 according to non-overlapping hopping frequencies. When the Bluetooth transceivers 102 and 104 are operated in the synchronized transmission mode or the synchronized receiving mode, the frequency hopping of the Bluetooth transceiver 102 and frequency hopping of the Bluetooth transceivers 104 are staggered from each other. By arranging the frequency hopping of the Bluetooth transceivers 102 and 104, there is no inter-radio interference between the transceiving synchronized Bluetooth transceivers 102 and 104.

Figure 3:
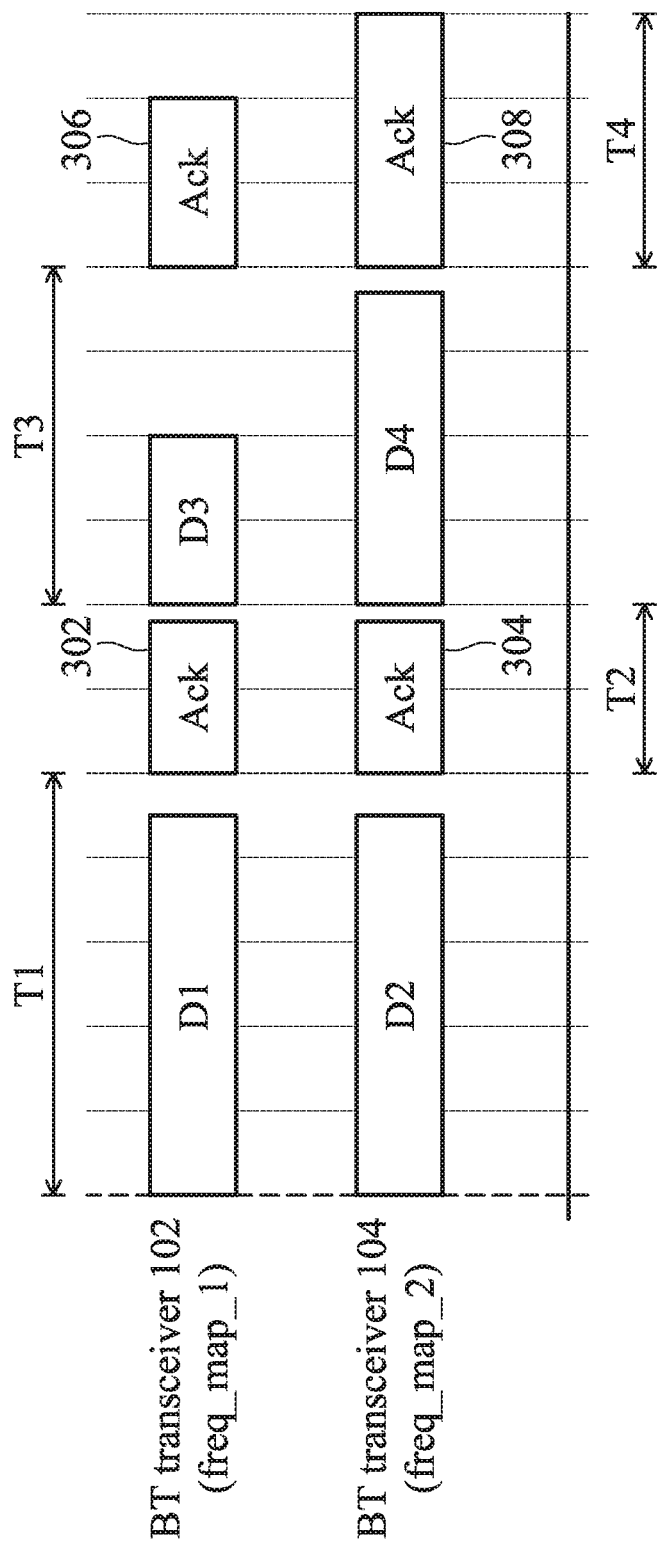
FIG. 3 depicts the concept of synchronized transmission and synchronized reception between the different Bluetooth transceivers 102 and 104.

FIG. 3 depicts the concept of synchronized transceiving between the different Bluetooth transceivers 102 and 104. During time period T1, both the Bluetooth transceivers 102 and 104 are operated in the transmission mode. Data D1 is transmitted using the frequency map freq_map_1 while data D2 is transmitted using the freq_map_2. During time period T2, both the Bluetooth transceivers 102 and 104 are switched to the receiving mode. Using the frequency map freq_map_1, the Bluetooth transceiver 102 receives acknowledgement 302 from the far end that has received the data D1. Using the frequency map freq_map_2, the Bluetooth transceiver 104 receives acknowledgement 304 from the far end that has received the data D2. During time period T3, both the Bluetooth transceivers 102 and 104 are switched back to the transmission mode. Data D3 is transmitted using the frequency map freq_map_1 while data D4 is transmitted using the freq_map_2. As shown, the amount of data D4 is much greater than data D3. However, the Bluetooth transceiver 102 has to be kept in the transmission mode with the Bluetooth transceiver 104. During time period T4, the Bluetooth transceivers 102 and 104 are switched to the receiving mode together. Using the frequency map freq_map_1, the Bluetooth transceiver 102 receives acknowledgement 306 from the far end that has received the data D3. Using the frequency map freq_map_2, the Bluetooth transceiver 104 receives acknowledgement 308 from the far end that has received the data D4. In this example, it takes longer time in receiving the acknowledgement 308. Note that the Bluetooth transceiver 102 is kept in the receiving mode with the Bluetooth transceiver 104.

Because it is forbidden to operate the Bluetooth transceiver 102 in the receiving mode while the Bluetooth transceiver 104 is operated in the transmission mode, the transmission of the data D4 does not affect the receiving of the acknowledgement 306. Mutual interference between the Bluetooth transceivers 102 and 104 is effectively suppressed.

Figure 4A:
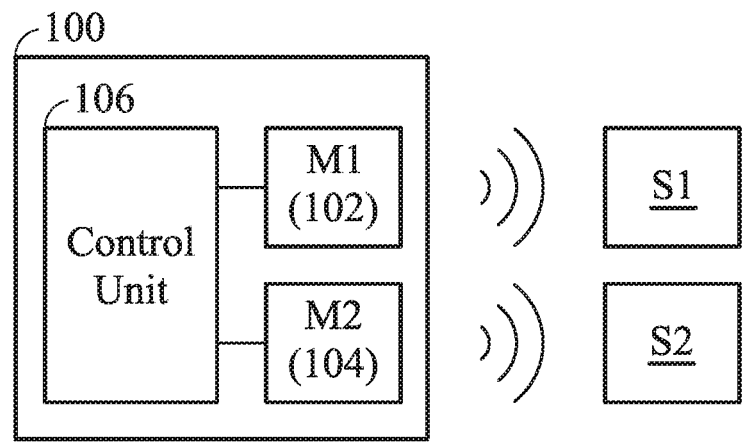
FIGS. 4A to 4C illustrate the various master-slave pairings.
Figure 4B:
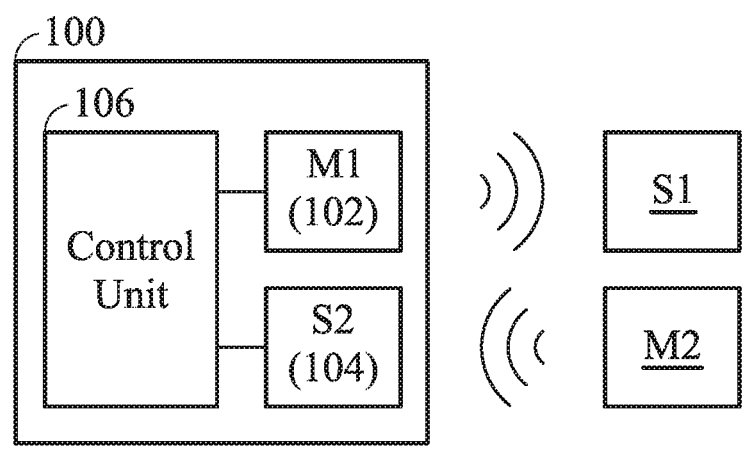
Figure 4C:
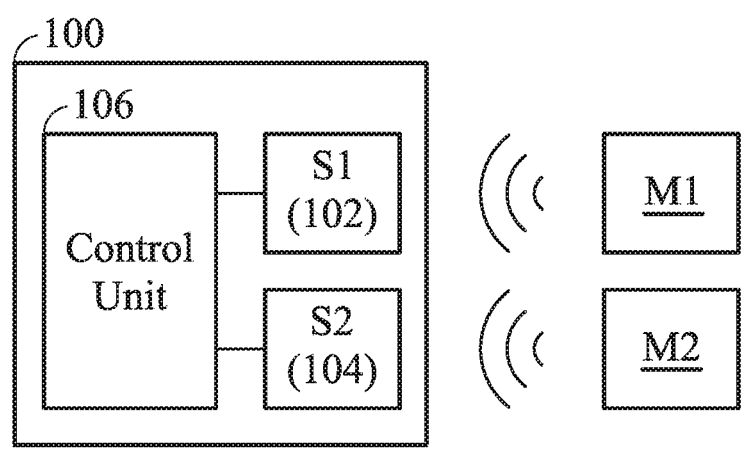

FIGS. 4A to 4C illustrate the various master-slave pairings.

In FIG. 4A, the Bluetooth transceivers 102 and 104 are masters (M1 and M2) paring with far-end Bluetooth transceivers S1 and S2 which are slaves. The control unit 106 issues the need for synchronized transceiving and, accordingly, the master M1 and master M2 determine non-overlapping frequency maps freq_map_1 and freq_map_2, or partially-overlapping frequency maps freq_map_1 and freq_map_2 which are used according to non-overlapping hopping frequencies.

In FIG. 4B, the Bluetooth transceiver 102 is a master (M1) paring with a far-end Bluetooth transceiver S1 which is the slave, and the Bluetooth transceiver 104 is a slave (S2) paring with a far-end Bluetooth transceiver M2 which is the master. The slave S2 (104) follows the frequency map freq_map_2 determined by the master M1 and the frequency information is collected by the control unit 106 and passed to the master M1 (102) by the control unit 106. The master M1 (102) determines the frequency map freq_map_1 that does not overlap the frequency map freq_map_2, or that partially overlaps the frequency map freq_map_2 (used according to non-overlapping hopping frequencies). Synchronized transceiving between the Bluetooth transceivers 102 and 104, therefore, are achieved.

In FIG. 4C, the Bluetooth transceivers 102 and 104 are slaves (S1 and S2) paring with far-end Bluetooth transceivers M1 and M2 which are masters. The control unit 106 issues the need for synchronized transceiving and, accordingly, the slaves S1 and S2 recommend that the connected masters M1 and M2 determine non-overlapping frequency maps freq_map_1 and freq_map_2, or partially-overlapping frequency maps freq_map_1 and freq_map_2 which are used by non-overlapping hopping frequencies. The slaves S1 and S2 following the frequency maps freq_map_1 and freq_map_2 determined by the masters M1 and M2, therefore, are operated with synchronized transceiving.

Figure 5A:
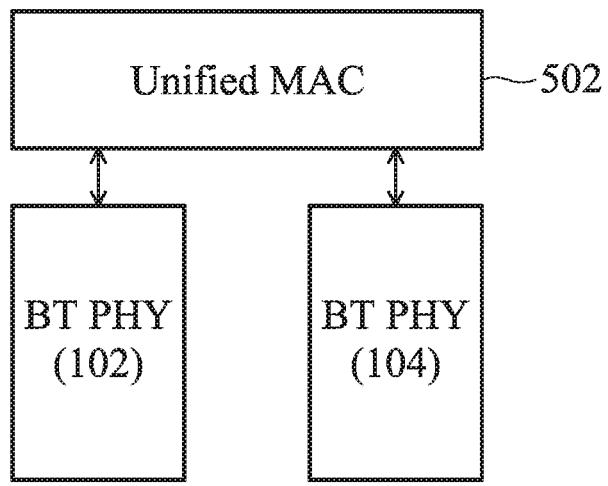
FIGS. 5A and 5B illustrate the design of the control unit 106.
Figure 5B:
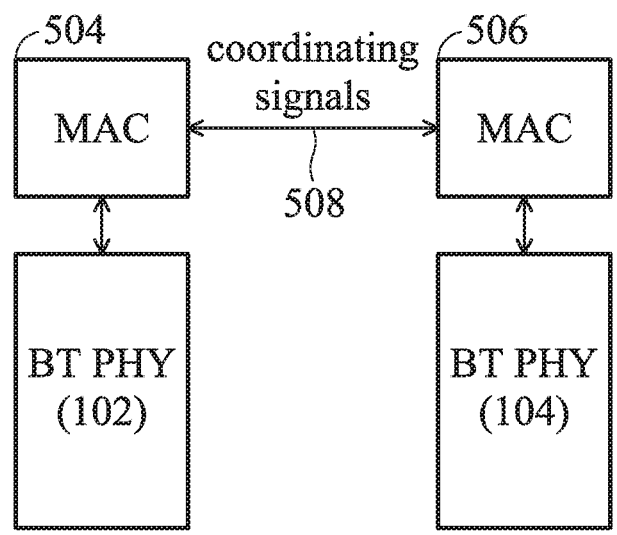

FIGS. 5A and 5B illustrate the design of the control unit 106.

FIG. 5A shows a unified media access controller (MAC) 502 provided to implement the control unit 106. The MAC 502 controls the Bluetooth physical layer (BT PHY) of the Bluetooth transceiver 102 and the Bluetooth physical layer (BT PHY) of the Bluetooth transceiver 104 for synchronized transceiving between the Bluetooth transceivers 102 and 104.

FIG. 5B shows separated media access controllers 504 and 506. The Bluetooth physical layer (BT PHY) of the Bluetooth transceiver 102 is controlled by the MAC 504, and the Bluetooth physical layer (BT PHY) of the Bluetooth transceiver 104 is controlled by the MAC 506. According to coordinating signals 508, the MAC 504 and the MAC 506 synchronize the transceiving of the Bluetooth transceivers 102 and 104. The MAC 504 and the MAC 506 coordinating with based on coordinating signals 508 form the control unit 106.

The MIMO Bluetooth module 100 may be used in carrier aggregation (CA) use cases or dual mode dual concurrent (DMDC) use cases.

Figure 6A:
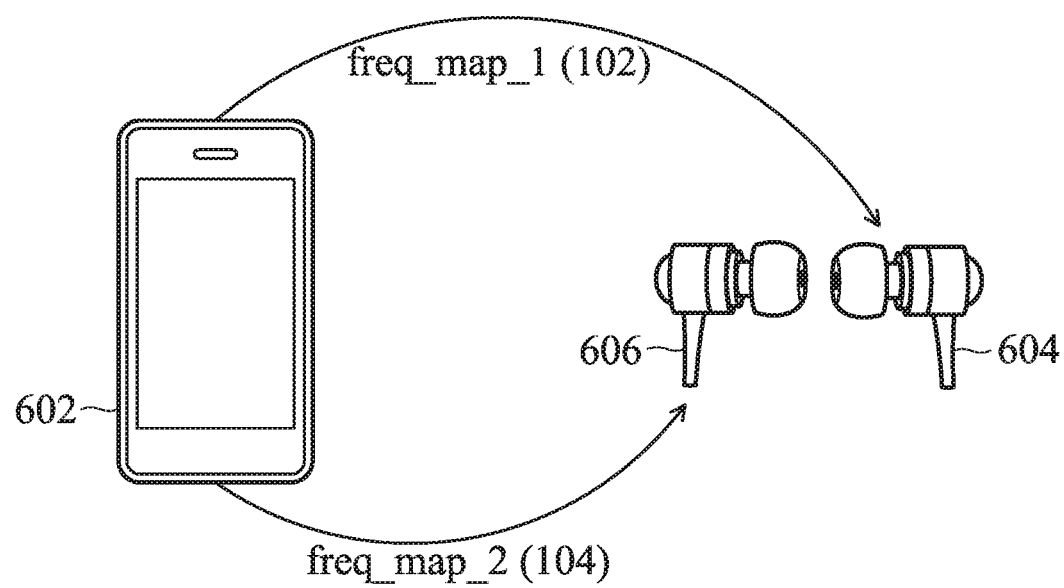
FIG. 6A depicts a carrier aggregation (CA) scenario using the MIMO Bluetooth module 100.

FIG. 6A depicts a carrier aggregation (CA) scenario using the MIMO Bluetooth module 100. A smartphone 602 is shown, which includes the MIMO Bluetooth module 100. Using the frequency map freq_map_1, a right-ear audio stream is transmitted from the Bluetooth transceiver 102 to a right-ear Bluetooth earphone 604. Using the frequency map freq_map_2, a left-ear audio stream is transmitted from the Bluetooth transceiver 104 to a left-ear Bluetooth earphone 606. The mutual interference between the two Bluetooth transceivers 102 and 104 is effectively suppressed because of the synchronized transceiving which is performed based on frequency division (non-overlapping frequency maps or partially-overlapping frequency maps with non-overlapping hopping frequencies). The audio play is much fluent in comparison with a conventional design using just one Bluetooth transceiver.

Figure 6B:
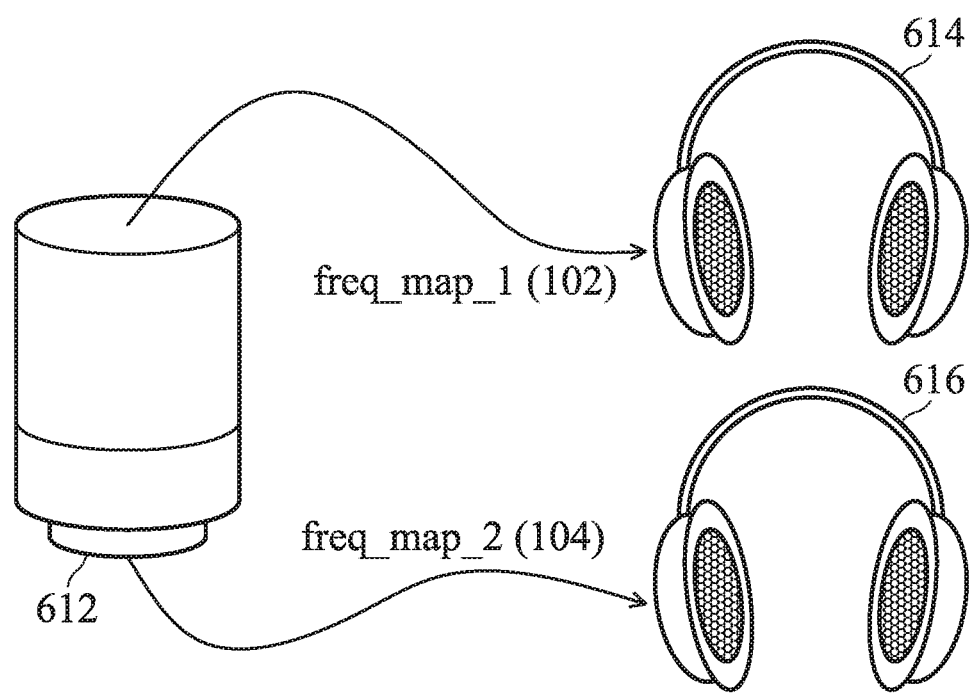
FIG. 6B depicts another carrier aggregation (CA) scenario using the MIMO Bluetooth module 100.

FIG. 6B depicts another carrier aggregation (CA) scenario using the MIMO Bluetooth module 100. A smart speaker 612 is shown, which includes the MIMO Bluetooth module 100. Using the frequency map freq_map_1, a first audio stream is transmitted from the Bluetooth transceiver 102 to a first Bluetooth headset 614. Using the frequency map freq_map_2, a second audio stream is transmitted from the Bluetooth transceiver 104 to a second Bluetooth headset 616. The mutual interference between the two Bluetooth transceivers 102 and 104 is effectively suppressed because of the synchronized transceiving which is performed based on frequency division (non-overlapping frequency maps or partially-overlapping frequency maps with non-overlapping hopping frequencies).

In another exemplary embodiment using carrier aggregation, the Bluetooth transceivers 102 and 104 transmit one file by a doubled bandwidth due to the synchronized transmission mode. One section of the file is transmitted by the Bluetooth transceiver 102 while the remaining section of the same file is transmitted by the Bluetooth transceiver 104.

In another exemplary embodiment using carrier aggregation, the Bluetooth transceivers 102 and 104 transmit a first file and a second file, respectively, at the same time.

Figure 7:
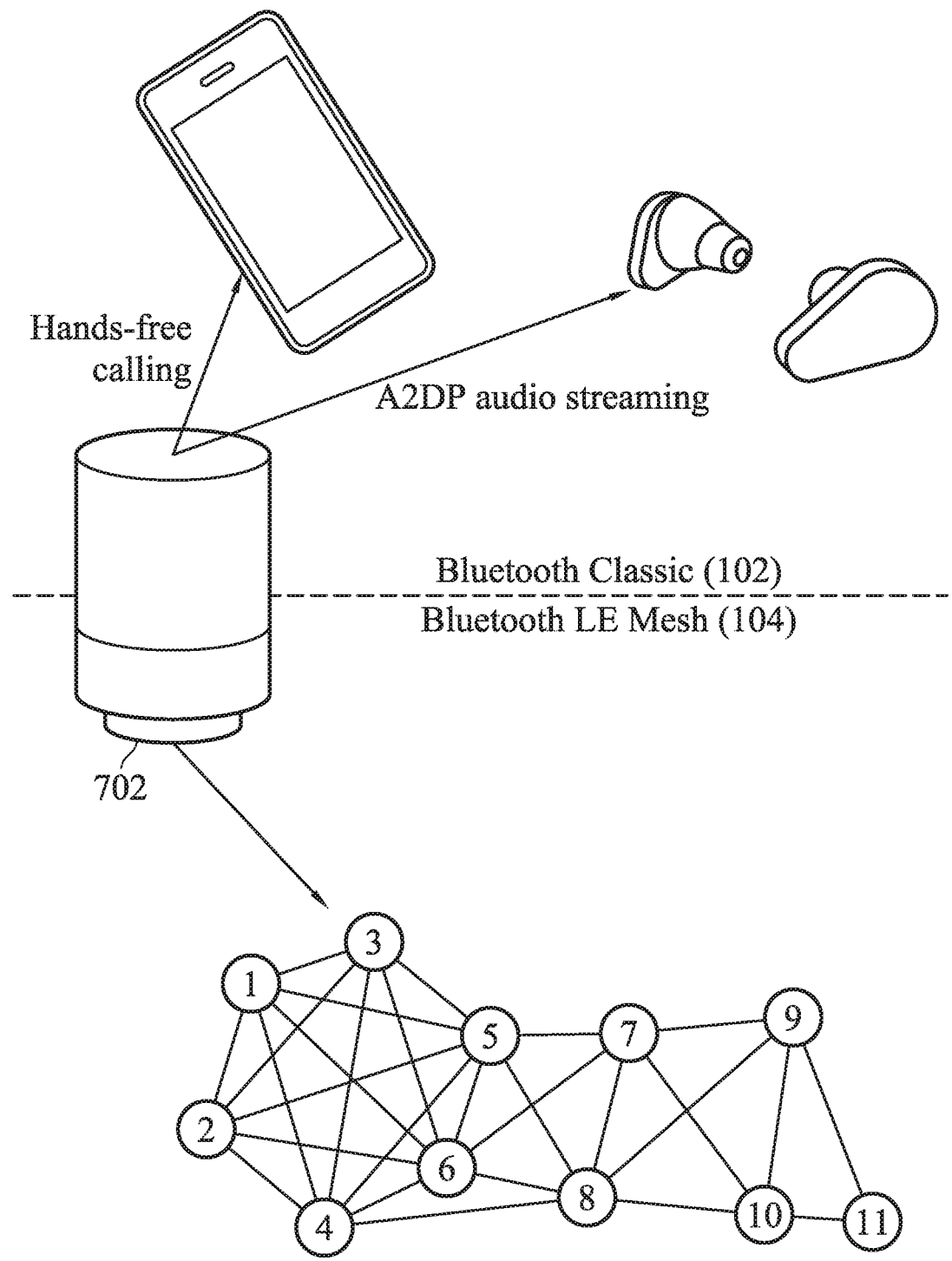
FIG. 7 depicts a dual mode dual concurrent (DMDC) scenario using the MIMO Bluetooth module 100.

FIG. 7 depicts a dual mode dual concurrent (DMDC) scenario using the MIMO Bluetooth module 100. Bluetooth communication is further used as the solution for building an IoT (Internet of Things). A smart speaker 702 is shown, which includes the MIMO Bluetooth module 100. One Bluetooth transceiver 102 is operated in a Bluetooth classic mode (for hands-free calling or for A2DP audio streaming) while another Bluetooth transceiver 104 is operated in a Bluetooth low-energy mesh mode (for building IoT). The frequency map for the Bluetooth classic mode may partially overlap the frequency map for Bluetooth LE mesh. The partially-overlapping frequency maps are used according to non-overlapping hopping frequencies.

According to the frequency division way, the mutual interference between the two Bluetooth transceivers 102 and 104 is effectively suppressed by the synchronized transceiving of the Bluetooth transceivers 102 and 104. By the MIMO Bluetooth architecture with suppressed mutual interference, the Bluetooth LE mesh mode is always on without being paused for Bluetooth classic mode operations such as hands-free calling or A2DP audio streaming. Other Bluetooth modes may be also selected to build the DMDC scenario.

Figure 8:
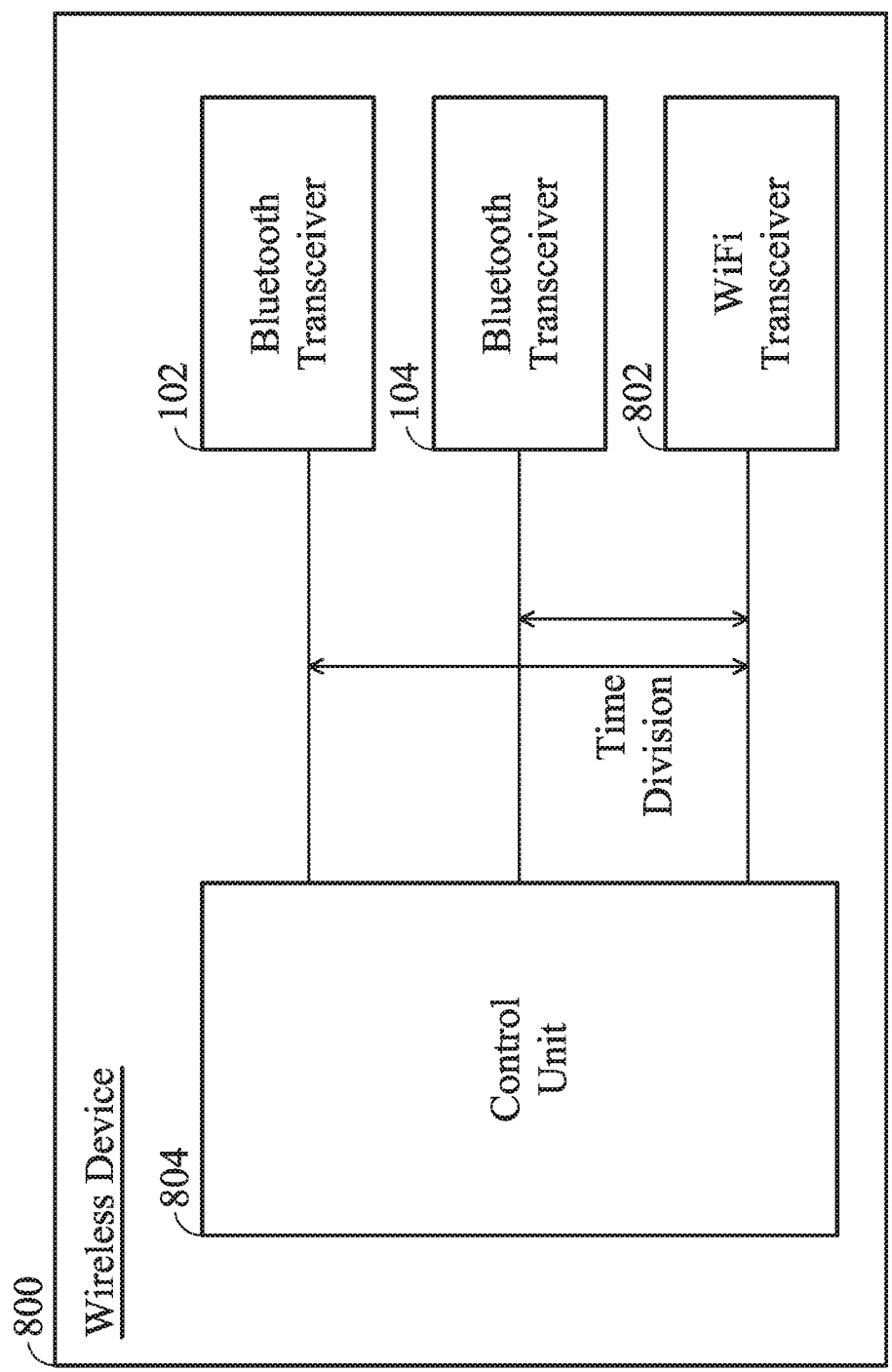
FIG. 8 is a block diagram of a wireless device 800 having a WiFi transceiver 802 in addition of the Bluetooth transceivers 102 and 104.

FIG. 8 is a block diagram of a wireless device 800 having a WiFi transceiver 802 in addition of the Bluetooth transceivers 102 and 104. A control unit 804 controls the WiFi transceiver 802 and the Bluetooth transceivers 102 and 104. The control unit 804 synchronizes the transceiving of the Bluetooth transceivers 102 and 104 based on frequency division (non-overlapping frequency maps or partially-overlapping frequency maps with non-overlapping hopping frequencies). A wider bandwidth is provided by the transceiving synchronized Bluetooth transceivers 102 and 104. The throughput of Bluetooth propagation is raised and thereby the air time of data and power consumption are reduced. The WiFi transceiver 802 sharing the bandwidth with the Bluetooth transceivers 102 and 104 by time division, therefore, having longer time to transmit or receive WiFi data. There is a good coexistence between the Bluetooth transceivers 102 and 104 and the WiFi transceiver 802.

The control unit 804 may have various designs. In an exemplary embodiment, the wireless device 800 may use the MIMO Bluetooth module 100 that includes the Bluetooth transceivers 102 and 104 and the control unit 106. The control unit 106 may be combined with a MAC controlling the WiFi transceiver 802 to form the control unit 804.

In some exemplary embodiments, the number of Bluetooth transceivers with synchronized transceiving is more than two.

Other techniques that use the aforementioned concepts to implement an MIMO Bluetooth module (comprising multiple Bluetooth transceivers within a combo chip or having multiple Bluetooth transceivers mounted on a PCB board to be equipped to a device) are within the scope of the disclosure. Based on the above contents, the present invention further relates to methods for reducing mutual interference between Bluetooth transceivers within one MIMO Bluetooth module.

A method for reducing mutual interference between Bluetooth transceivers within one MIMO Bluetooth module in accordance with an exemplary embodiment of the disclosure comprises the following steps: operating a first Bluetooth transceiver and a second Bluetooth transceiver according to a synchronized transmission mode, stopping using the first Bluetooth transceiver to transmit data while the second Bluetooth transceiver is receiving data; and stopping using the second Bluetooth transceiver to transmit data while the first Bluetooth transceiver is receiving data.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-input multi-output Bluetooth module, comprising:
    a first Bluetooth transceiver and a second Bluetooth transceiver; and
    a control unit coupled to the first Bluetooth transceiver and the second Bluetooth transceiver, arranging a synchronized transmission mode to operate the first Bluetooth transceiver and the second Bluetooth transceiver,
    wherein:
    the control unit stops using the first Bluetooth transceiver to transmit data while the second Bluetooth transceiver receiving data;
    the control unit stops using the second Bluetooth transceiver to transmit data while the first Bluetooth transceiver is receiving data;
    the first Bluetooth transceiver is paired with a first far-end Bluetooth transceiver, and the second Bluetooth transceiver is paired with a second far-end Bluetooth transceiver;
    a first master between the paired first Bluetooth transceiver and the first far-end Bluetooth transceiver determines a first frequency map for communication between the paired first Bluetooth transceiver and the first far-end Bluetooth transceiver;
    a second master between the paired second Bluetooth transceiver and the second far-end Bluetooth transceiver determines a second frequency map for communication between the paired second Bluetooth transceiver and the second far-end Bluetooth transceiver; and
    the first frequency map and the second frequency map do not overlap, or partially overlap, wherein the partially overlapped first and second frequency maps are used according to non-overlapping hopping frequencies.

2. The multi-input multi-output Bluetooth module as claimed in claim 1, wherein:
    the control unit operates the first Bluetooth transceiver and the second Bluetooth transceiver by frequency division when the first Bluetooth transceiver and the second Bluetooth transceiver are in the synchronized transmission mode.

3. The multi-input multi-output Bluetooth module as claimed in claim 1, wherein:
    the control unit operates the first Bluetooth transceiver and the second Bluetooth transceiver to make a frequency map of the second Bluetooth transceiver does not overlap a frequency map of the first Bluetooth transceiver.

4. The multi-input multi-output Bluetooth module as claimed in claim 1, wherein:

the control unit operates the first Bluetooth transceiver and the second Bluetooth transceiver to make a frequency map of the second Bluetooth transceiver partially overlaps a frequency map of the first Bluetooth transceiver; and the control unit controls the first Bluetooth transceiver and the second Bluetooth transceiver to operate at non-overlapping hopping frequencies.

5. The multi-input multi-output Bluetooth module as claimed in claim 2 wherein:

the control unit further arranges a synchronized receiving mode to operate the first Bluetooth transceiver and the second Bluetooth transceiver.

6. The multi-input multi-output Bluetooth module as claimed in claim 5, wherein:

the control unit operates the first Bluetooth transceiver and the second Bluetooth transceiver by frequency division when the first Bluetooth transceiver and the second Bluetooth transceiver are in the synchronized receiving mode.

7. The multi-input multi-output Bluetooth module as claimed in claim 6, wherein:

the control unit operates the first Bluetooth transceiver and the second Bluetooth transceiver for carrier aggregation.

8. The multi-input multi-output Bluetooth module as claimed in claim 7, wherein:

the first Bluetooth transceiver and the second Bluetooth transceiver transmit one file by a doubled bandwidth due to the synchronized transmission mode.

9. The multi-input multi-output Bluetooth module as claimed in claim 7, wherein:

the first Bluetooth transceiver and the second Bluetooth transceiver transmit a first file and a second file, respectively, at the same time.

10. The multi-input multi-output Bluetooth module as claimed in claim 6, wherein:

the control unit operates the first Bluetooth transceiver and the second Bluetooth transceiver in a way of dual mode dual concurrent (DMDC).

11. The multi-input multi-output Bluetooth module as claimed in claim 10, wherein:

when the first Bluetooth transceiver is in a Bluetooth classic mode, the second Bluetooth transceiver is in a Bluetooth low-energy mesh mode.

12. The multi-input multi-output Bluetooth module as claimed in claim 6, wherein:

the first Bluetooth transceiver is a master paired with the first far-end Bluetooth transceiver that is a slave, and the second Bluetooth transceiver is a master paired with the second far-end Bluetooth transceiver that is a slave;

the first Bluetooth transceiver determines the first frequency map for communication with the first far-end Bluetooth transceiver and the second Bluetooth transceiver determines the second frequency map for communication with the second far-end Bluetooth transceiver; and the control unit controls the first Bluetooth transceiver and the second Bluetooth transceiver to make sure that the first frequency map and the second frequency map do not overlap, or to make the first frequency map and the second frequency map partially overlap.

13. The multi-input multi-output Bluetooth module as claimed in claim 6, wherein:

the first Bluetooth transceiver is a master paired with the first far-end Bluetooth transceiver that is a slave, and the second Bluetooth transceiver is a slave paired with the second far-end Bluetooth transceiver that is a master;

the first Bluetooth transceiver determines the first frequency map for communication with the first far-end Bluetooth transceiver and the second far-end Bluetooth transceiver determines the second frequency map for communication with the second Bluetooth transceiver; and the first Bluetooth transceiver determines the first frequency map according to the second frequency map to make the first frequency map and the second frequency map do not overlap, or to make the first frequency map and the second frequency map partially overlap.

14. The multi-input multi-output Bluetooth module as claimed in claim 6, wherein:

the first Bluetooth transceiver is a slave paired with the first far-end Bluetooth transceiver that is a master, and the second Bluetooth transceiver is a slave paired with the second far-end Bluetooth transceiver that is a master;

the first far-end Bluetooth transceiver determines the first frequency map for communication with the first Bluetooth transceiver and the second far-end Bluetooth transceiver determines the second frequency map for communication with the second Bluetooth transceiver; and the control unit controls the first Bluetooth transceiver and the second Bluetooth transceiver to provide recommendations for the first far-end Bluetooth transceiver and the second far-end Bluetooth transceiver, and thereby the first far-end Bluetooth transceiver and the second far-end Bluetooth transceiver make the first frequency map and the second frequency map do not overlap, or make the first frequency map and the second frequency map partially overlap.

15. The multi-input multi-output Bluetooth module as claimed in claim 6, wherein:

the control unit includes a unified media access controller controlling both the first Bluetooth transceiver and the second Bluetooth transceiver.

16. The multi-input multi-output Bluetooth module as claimed in claim 6, wherein:

the control unit includes a first media access controller and a second media access controller controlling the first Bluetooth transceiver and the second Bluetooth transceiver, respectively; and the first media access controller and the second media access controller coordinate with each other according to coordinating signals, for the synchronized transmission mode and the synchronized receiving mode of the first Bluetooth transceiver and the second Bluetooth transceiver.

17. A wireless device, comprising:

the multi-input multi-output Bluetooth module as claimed in claim 1; and a WiFi transceiver, wherein the WiFi transceiver and Bluetooth transceivers within the multi-input multi-output Bluetooth module share transmission band in a time division way.

18. The wireless device as claimed in claim 17, wherein:

the first Bluetooth transceiver and the second Bluetooth transceiver use a doubled bandwidth for Bluetooth data transmission to reserve more time for WiFi transmission.

19. The wireless device as claimed in claim 18, wherein:
the first Bluetooth transceiver and the second Bluetooth transceiver are operated according to frequency division when the first Bluetooth transceiver and the second Bluetooth transceiver are in the synchronized transmission mode.

20. The wireless device as claimed in claim 19 wherein:
the first Bluetooth transceiver and the second Bluetooth transceiver are operated according to frequency division when the first Bluetooth transceiver and the second Bluetooth transceiver are in a synchronized receiving mode.

\* \* \* \* \*